(12) United States Patent
Seuthe

(10) Patent No.: US 8,955,389 B2
(45) Date of Patent: Feb. 17, 2015

(54) METHOD AND DEVICE FOR MONITORING AND OPTIMIZING INJECTION MOLDING PROCESSES

(76) Inventor: Ulrich Seuthe, Wetter (DE)

( * ) Notice: Subject to any disclaimer, the term of this patent is extended or adjusted under 35 U.S.C. 154(b) by 258 days.

(21) Appl. No.: 13/702,680

(22) PCT Filed: Jun. 7, 2011

(86) PCT No.: PCT/EP2011/002786
§ 371 (c)(1), (2), (4) Date: Mar. 13, 2013

(87) PCT Pub. No.: WO2011/154123
PCT Pub. Date: Dec. 15, 2011

(65) Prior Publication Data
US 2013/0167653 A1    Jul. 4, 2013

(30) Foreign Application Priority Data

Jun. 7, 2010 (DE) .................... 20 2010 007 655 U

(51) Int. Cl.
*G01F 1/20* (2006.01)
*G01F 1/66* (2006.01)
*B29C 45/76* (2006.01)

(52) U.S. Cl.
CPC ............. *G01F 1/666* (2013.01); *B29C 45/76* (2013.01); *B29C 2945/76036* (2013.01); *B29C 2945/76056* (2013.01); *B29C 2945/76163* (2013.01); *B29C 2945/76257* (2013.01); *B29C 2945/76287* (2013.01); *B29C 2945/76471* (2013.01); *B29C 2945/76829* (2013.01); *B29C 2945/76892* (2013.01)
USPC ........................................................ 73/861.18

(58) Field of Classification Search
USPC .................. 73/861.18, 861.27, 861.19, 865.9
See application file for complete search history.

(56) References Cited

U.S. PATENT DOCUMENTS

| | | | | | |
|---|---|---|---|---|---|
| 4,978,883 | A | * | 12/1990 | Komurasaki | .................... 310/329 |
| 5,792,396 | A | * | 8/1998 | Takizawa | ...................... 264/40.5 |
| 2004/0011135 | A1 | * | 1/2004 | Brammer | ......................... 73/652 |
| 2004/0139810 | A1 | | 7/2004 | Saito et al. | |

FOREIGN PATENT DOCUMENTS

| | | |
|---|---|---|
| DE | 102006033421 | 10/2007 |
| DE | 102008047002 | 3/2010 |
| EP | 0737560 | 10/1996 |
| EP | 2317308 | 5/2011 |
| JP | 2002273773 | 9/2002 |
| WO | WO 03036289 | 1/2003 |
| WO | WO 2005111598 | 11/2005 |
| WO | WO 2009135719 | 11/2009 |
| WO | WO 2010094809 | 8/2010 |

* cited by examiner

*Primary Examiner* — Jewel V Thompson
(74) *Attorney, Agent, or Firm* — Fay Sharpe LLP

(57) ABSTRACT

The invention relates to a method and a device for monitoring and/or optimizing flow processes, in particular injection molding processes. Vibrations caused by a flow of a material are detected and analyzed, wherein a vibration spectrum is detected at different times or in a (virtually) continuous manner and subjected to a multidimensional analysis.

15 Claims, 1 Drawing Sheet

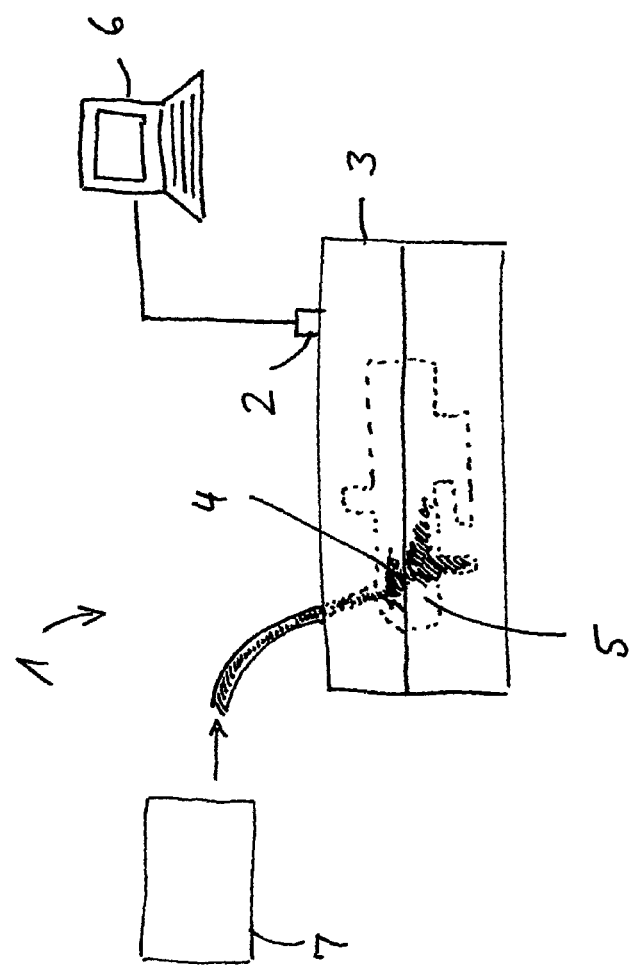

METHOD AND DEVICE FOR MONITORING AND OPTIMIZING INJECTION MOLDING PROCESSES

FIELD OF THE INVENTION

The invention pertains to a method and a device for monitoring and optimizing injection moulding processes based on an analysis of the vibration spectrum developing before, during and/or after injection-moulding a component.

BACKGROUND OF THE INVENTION

In injection moulding processes, liquid materials are injected into special moulds, cooled after the injection process and subsequently removed.

In this case, the entire process is affected by different states of pressure, temperature, frictions, aggregation states and the like that are associated with the respective injection moulding material, the mould and the injection moulding method.

As a rule, the injection moulding material needs to be heated and then injected into more or less complex moulds under high pressure, e.g., up to 100 bar, wherein the liquid material flows through channels of different volumes, respectively cools or adheres to the walls, backs up at constrictions and is subjected to turns.

At the end of the initial filling process, the volume of the filling material that shrinks during the cooling process is filled with additional material by means of so-called post-injecting in order to ensure that the mould is completely filled.

The moulding tool needs to absorb the corresponding forces, ensure the appropriate heat dissipation and once again eject the injection moulding material at the end of the process.

Other system elements prepare the injection moulding material for the injection moulding process with respect to thermal and pressure-related aspects.

Due to different process variations, defects or deficiencies may respectively occur during the manufacture of the injection-moulded part.

It would be possible, for example, that
the mould is not completely filled,
a protruding element of the mould fractures,
different cooling speeds lead to tensions in the injection-moulded part,
interruptions in the cooling cycle falsify the temperature profile during the cooling process,
the injection-moulded part is damaged by defective ejectors,
the material supply or preparation is defective,
the temperature and therefore the viscosity deviates and leads to various filling and cooling defects,
explosion-like behavior under pressure leads to filling defects and burns.

The aforementioned defects and other defects are difficult to identify. The reason for the defect needs to be determined by means of technical investigations and tests on the defective injection-moulded part. Defective injection-moulded parts frequently also cannot be readily identified as such, i.e., large quantities of rejects are produced before the defect is detected and the process can subsequently be optimized by means of experimental parameter changes.

In addition, injection moulding tools may cost several hundred thousand Euros. The monitoring of their proper function, as well as the timely initiation of maintenance procedures, therefore is of utmost economical importance.

WO2010/051954 discloses a sound-based method for checking components. However, the range of application is limited to solid components and their processing by means of machining, forming, etc.

SUMMARY OF THE INVENTION

Based on these circumstances, the invention aims to develop a method and a device for monitoring and optimizing injection moulding processes that make it possible to precisely monitor and/or analyze an injection moulding process.

This objective is attained with the respective characteristics of claims 1 and 9.

Accordingly, structure-borne sound sensors respectively are directly or indirectly connected or coupled to the injection mould or to the filling apparatus and the vibrations generated in the mould or the apparatus by the injection moulding process, as well as by the tool motion during the closing, opening and ejecting processes, are measured.

These vibrations, particularly in the frequency range up to 200 kHz, make it possible to obtain information on the process currently taking place and its characteristics.

Reference models with respect to the tool, the material and other process characteristics are stored on the basis of a complete process measurement in order to serve as a comparison for future process sequences. From a technological point of view, any signal deviation can be assigned to a process change and used for monitoring or controlling the process.

Influences due to peculiarities or changes of the tools or the machine elements or the control and the involved operating means manifest themselves in the vibration pattern of the structure-borne sound.

The vibrations in the solid body, particularly in the tool (e.g., injection mould) are measured on the surfaces of the tool or in the tool by means of structure-borne sound sensors. If applicable, an additional sensor may be provided, for example, in order to directly monitor a material supply device such as an injection device, a feed screw or an extruder. A separate sensor may also be provided on the cooling device for the mould. Sensors can be easily and cost-effectively retrofitted on the respective outer surfaces of existing devices such as injection moulds. The sensors may be screwed, bonded, pressed, etc. on these outer surfaces. A sensor is able to better record vibrations if it is arranged on an inner surface, i.e., on a surface that faces the cavity. The damping caused by the material of the mould is eliminated in this case. In this way, vibrations that could not be measured if the sensor would be arranged on the outer surface of the mould can be rendered audible. The signal-to-noise ratio can increase by an order of magnitude. A sensor that is arranged on the inner surface of the mould can influence the flow of the material in the mould, as well as other characteristics such as, for example, the cooling behavior. In order to minimize these influences, a sensor for the inner surface of the mould can be completely or at least partially inserted into the inner surface. For this purpose, a recess such as, e.g., a bore may be provided for the sensor. The sensor may end flush with the inner surface or be covered by a layer of sealing or fixing material such as, e.g., resin, and such material is preferably used anyway. Such an embedding of the sensor may also be realized on the outer side of the mould, wherein a recess that extends into the mould from outside is provided in this case in order to insert the sensor therein. The deeper the recess, the closer the sensor can be arranged to flow processes and/or cooling processes, etc., in the interior of the mould.

Sensors that are already provided on or in moulds for pressure monitoring purposes or the like and comprise a piezoelectric element may also be used for recording the vibration spectrum.

The vibrations are scanned and digitized with high frequency and then displayed in the frequency range and analyzed.

The frequency display takes place on the basis of many successive short-time frequency transformations that represent the time history of the frequency responses and the intensities of the vibrations. This makes it possible to identify different sources of sound due to their frequency response, their chronological position and their special dynamics.

The frequency-transformed scanning values are for this purpose mapped in an elevation profile that is defined by the coordinates time, frequency and sound intensity.

In addition, the condition of the tools can be determined based on their sound emissions in the operating state, as well as special motion and pressure states realized for test purposes.

Wear and damages in part manifest themselves in changed operating sounds that can provide information on whether the tool needs to be serviced or can still perform a number of operating cycles.

For this purpose, the tool (e.g., the injection mould) is either permanently or only temporarily equipped with structure-borne sound sensors for test purposes.

In the new or intact state, a reference model of the motion and process sounds of the tool is recorded. All subsequent measurements are compared with this reference model and the degree of wear is quantified based on the deviating structure-borne sound emissions.

In this respect, it is important to achieve a sufficient resolution of the dynamic work sequence with respect to the time, the frequency and the intensity of the structure-borne sound signals in order to allow an assignment of the motion sequence to individual tool elements.

The inventive recording of the vibration spectrum at different times and preferably in a continuous or (virtually) continuous fashion with an appropriate sample rate allows a multidimensional data analysis that forms the basis for a precise analysis of a component, workpiece, tool and/or processing sequence.

In a preferred embodiment, the multidimensional data analysis can be displayed with three dimensions, for example, in the form of a landscape that may extend through a space that is defined, e.g., by a frequency axis, a time axis and an amplitude axis. The landscape visualizes the time history of the sound emissions and has characteristic features that respectively form a virtual fingerprint. These characteristic features can be determined with suitable methods. Deviations from these characteristic features likewise can be determined. Characteristic features can also be determined in the multidimensional data for certain defects or defect types. The quality of an injection moulding process can be determined in a highly reliable fashion in real time, particularly while the injection moulding process is carried out, based on the multidimensional data that in the preferred embodiment forms a landscape in the frequency-time-amplitude space. The degree of wear of the tool or a tool defect such as a fracture also can be determined and identified based on the corresponding characteristic features. Subsequently, the deviation from expected characteristics features can be determined and the correspondence with defect characteristics makes it possible to diagnose a certain defect or defect type.

The analysis is preferably carried out in an automated fashion based on pattern recognition. With respect to the multidimensional and, in particular, three-dimensional pattern recognition, suitable algorithms can be used that can be quickly and reliably realized in a computer-based fashion with adjustable recognition parameters and access stored vibration spectrum data or process the vibration spectrum data in real time.

It is practical to provide a pattern database with patterns suitable for a certain application. In this case, the patterns may be stored in the form of pattern landscape sections, if applicable, with tolerance ranges and/or defined by functions.

With respect to an automated analysis, it is preferred to form an envelope of the recorded vibration spectrum or of sections thereof and to compare this envelope with a comparison envelope. In this case, the envelope is formed, for example, by means of a smoothing function from averaging adjacent data points in space or by utilizing appropriate methods for smoothing multidimensional data. The deviation between the envelope and the comparison envelope can be used as a measure for analyzing a component, workpiece, tool and/or process, e.g., the quality of an injection moulding process. In addition, the utilization of an envelope makes it possible to identify process sections such as, e.g., a flow separation, ejection defect, pressure fluctuations or the like in an automated fashion. The pattern recognition furthermore is simplified due to the utilization of an envelope and the recognition rate is improved.

The vibration spectrum for monitoring flow processes, particularly during the injection moulding process, is preferably recorded and analyzed with a frequency of 200 kHz and/or in a broadband fashion.

The recorded vibration spectrum is preferably subjected to a frequency-time analysis. Due to the frequency-time analysis, the recorded vibrations can be assigned to the process sequence by means of the time axis on the one hand and the interesting vibrations can be separated from uninteresting vibrations such as, e.g., machine vibrations or parasitic vibrations that occupy other frequency ranges on the other hand. The analysis therefore can concentrate on the characteristic range for the respective application.

The vibration spectrum is preferably recorded with a frequency resolution that corresponds to the flow-related and/or thermal processes and, if applicable, other application-dependent factors. It was determined that frequencies up to 200 kHz, in certain instances up to 100 kHz, are entirely sufficient in this respect. The lower frequency range preferably has a limit for detecting laminar flows of the material. The frequency required for this purpose depends, among other things, on the material properties, the injection pressure and the shape of the cavity to be filled.

The vibration spectrum is recorded with the coordinates frequency f, time t and amplitude A. This type of recording is suitable for a numerical analysis in a computer, wherein the coordinates may also be functions $a(f)$, $b(t)$ and/or $c(A)$ of the frequency f, the time t and the amplitude A or $a(f, t, A)$, $b(f, t, A)$ and/or $c(f, t, A)$ such that a three-dimensional array is stored in a given functional dependence on f, t, A, for example $(lf, mt, nA^x)$, wherein l, m, n, x are random numbers. The vibration spectrum can be graphically displayed with the three coordinates for illustration purposes and/or manual analysis. In this case, a three-dimensional display may be chosen, in which the frequency and the time define a plane and an elevation profile is defined by the amplitude (or a functional thereof). Such a graphic display simplifies the recognition of the vibrations that are relevant to the analysis, e.g., these vibrations can be assigned to the processing sequence due to the separation on the time axis and are separated from spurious vibrations and the like on the frequency axis.

A sound sensor, particularly a piezoelectric sound sensor, is preferably used for recording the vibrations. Sound sensors of this type are able to process the high frequencies required in accordance with the invention, have a broad frequency bandwidth, can be cost-effectively manufactured and require no maintenance.

The sensor, particularly the sound sensor, that may be arranged on the tool (mould) or a component that is vibrationally coupled to the tool is calibrated after its installation and preferably also periodically thereafter or prior to each use. This ensures a constant high precision of the measurement. A calibration is advantageous, in particular, if the sensor is attached to a new tool or removed for servicing and subsequently reattached because the attachment can result in a different coupling behavior. In order to carry out the calibration, the sound sensor is, according to the invention, acted upon with a certain electrical pulse in order to emit a sound signal. Subsequently, the echo of the sound signal is recorded and compared with a nominal echo. In this way, the quality of the coupling of the sound sensor to the workpiece or a tool or component can be determined and taken into account during the measurement.

The analysis preferably takes place in real time. This eliminates the need to store data. The storage of data may be practical for safety-relevant components in order to verify the absence of defects or to verify a defect. The data may be stored completely for the entire process or the entire monitoring period of a workpiece or component or only sectionally in time segments, in which interesting characteristics were detected.

Another aspect of the invention concerns the transformation of the vibration spectrum or an interesting frequency range thereof into the audible sound spectrum by means of a suitable, e.g. linear, function or mapping. This allows an acoustic analysis or evaluation by a person. The acoustic analysis is preferably carried out as a supplement to the multidimensional analysis, but may also replace this multidimensional analysis.

In a particularly preferred embodiment, patterns that are typical for damages are detected in the vibration spectrum. This makes it possible, among other things, to simplify an analysis that is limited to defect detection.

The invention also makes it possible to detect stress cracks caused by temperature fluctuations or generally damages caused by external influences.

The invention therefore proposes methods and devices that allow the automated monitoring, quality assurance and optimization of flow processes in general and injection moulding processes in particular.

Other characteristics and embodiments of the invention result from the claims, as well as the following description that refers to the enclosed figures.

DESCRIPTION OF THE EMBODIMENTS

The invention is initially described below with reference to an exemplary embodiment of an injection moulding process.

The device 1 for monitoring an injection moulding process illustrated in the figure comprises a sensor 2 for recording vibrations that is arranged, for example, on a tool 3, into which plastic 4 is injected under high pressure in order to mould a workpiece 5. The sensor 2 is connected to an analysis means 6 such as, e.g., a computer. The material that consists of plastic 4 in this case is supplied by a material feed device 7 that may consist of a container, an extruder, a feed screw, etc.

The sensor 2 preferably consists of a structure-borne sound sensor, e.g. a piezoelectric sensor, and preferably can not only record, but also emit structure-borne sound signals. The emission of structure-borne sound signals is particularly advantageous for the active monitoring of "quiet" flow processes because vibrations can be stimulated in this way. However, it is also possible to use other types of sensors as long as they are able to record vibrations within the interesting frequency range, e.g. motion sensors.

The sensor 2 is either coupled to the tool 3 as illustrated in an exemplary fashion or to a component that is vibrationally coupled thereto, namely in such a way that it can record vibrations caused by the flow process and/or thermal reactions. The sensor may simply be attached by means of screws. It may also be arranged in the interior of the mould 3 or inserted into a corresponding recess from the outside or the inside. It is also possible to use a sensor that actually serves for other purposes such as, e.g., the pressure measurement.

During the processing sequence, vibrations are created and recorded by the sensor 2. For this purpose, the sensor 2 is realized in such a way that it can record frequencies between a lower limiting value and an upper limiting value. Ideally, the lower limiting value is nearly 0 and the upper limiting value is 200 kHz such that the entire interesting spectrum can be recorded. An upper limiting value of at least 50 kHz, preferably at least 100 kHz, is advantageous in practical applications. Frequencies below 10 kHz or 50 kHz are preferably dampened or cut off because they do not contain any valuable information such that a corresponding lower limiting value is advantageous. With respect to flow processes and, in particular, injection moulding processes, however, a significantly reduced lower limiting value of about 50 Hz or 100 Hz is advantageous because valuable characteristic vibrations are also created in this low frequency range, possibly due to laminar flows. Consequently, a very broad-band frequency range between nearly 0 Hz and about 200 kHz is preferred because characteristic vibrations occur in the low frequency range, as well as in the high-frequency range.

The vibrations recorded by the sensor 2 are analyzed multidimensionally. For this purpose, the recorded vibration spectrum can be intermediately stored in the analysis means 6 that preferably consists of a computer with corresponding interface and suitable storage mediums.

A frequency-time analysis can be carried out in the analysis means 6 in such a way that the vibration spectrum is still graphically displayed and/or numerically analyzed during the recording or thereafter.

The display may be realized three-dimensionally with the coordinates time, frequency and amplitude (or maximum amplitude or intensity or the like) or two-dimensionally, in which case contour lines render the amplitude visible.

It is possible to recognize patterns that are characteristic for the respective injection moulding process. Such patterns also result for defects. Pattern recognition consequently makes it possible to detect or analyze process steps, e.g., by determining a measure for the deviation from a pattern, as well as to recognize and identify defects or at least deviations from the standard behavior, during the injection moulding process or thereafter during the cooling, hardening and removal from the mould.

A sensor may also be provided on or in the material feed device 7 and/or on an optionally provided cooling device for the mould 3 in order to monitor the material feed or the cooling device and, for example, to detect a failure thereof. If such a cooling device comprises channels in the tool 3, the sensor 2 that in this case monitors the cooling process, as well as the injection moulding process, or an additional sensor may be arranged in one of these channels or adjacent to or leading into one of these channels.

The invention claimed is:

1. A method for monitoring and/or optimizing flow processes, particularly injection moulding processes, characterized in that vibrations caused by a flow of a material are recorded and analyzed, wherein a vibration spectrum is recorded at different times or in a (virtually) continuous fashion and subjected to a multidimensional analysis.

2. The method according to claim 1, wherein the vibrations are recorded before, during and/or after the injection of material into a mould.

3. The method according to claim 2, wherein the vibration sensor used is arranged on an outer surface of the mould, an inner surface of the mould and/or at least partially inserted into the mould.

4. The method according to claim 2, wherein structure-borne sound on the mould with a frequency up to 200 kHz is recorded.

5. The method according to claim 2, wherein an additional sound sensor is used on the material feed device and/or an additional sound sensor is used on a cooling device for the mould in order to record at least one additional vibration spectrum and to monitor and/or optimize the material feed or the cooling process, respectively.

6. The method according claim 1, wherein motion and/or pressure states provided for test purposes are realized on the mould and/or during the injection of the material.

7. The method according claim 1, wherein a sound sensor (2) with a piezoelectric element is used for recording the vibration spectrum.

8. The method according to claim 1, wherein the analysis essentially takes place in real time.

9. A device (1) for monitoring and/or optimizing flow processes, particularly injection moulding processes, especially for carrying out the method according to claim 1, characterized in that the device can be coupled to a sensor (2) for recording a vibration spectrum occurring during a flow process and features analyzing means (6) for the multidimensional analysis of the vibration spectrum recorded at different times or in a (virtually) continuous fashion.

10. The device according to claim 9, characterized in that the sensor (2) is arranged on a mould, into which material can be injected under pressure and/or increased temperature.

11. The device according to claim 10, characterized by another sound sensor on a material feed device such as a feed screw or an extruder and/or by an additional sound sensor on a cooling device for the mould in order to record at least one additional vibration spectrum and to monitor and/or optimize the material feed or the cooling device, respectively.

12. The device according to claim 10, characterized in that the sensor (2) is arranged on an inner surface of the mould.

13. The device according to claim 10, wherein the mould features cooling elements, in which an additional sensor (2) is arranged.

14. The device according to claim 9, characterized in that the sensor or the sensors can record structure-borne sound that is generated by a laminar flow of the flowing material.

15. The device according to claim 9, characterized in that the sensor or the sensors can record structure-borne sound with a frequency up to 200 kHz.

* * * * *